(12) United States Patent
Pione et al.

(10) Patent No.: US 7,620,755 B2
(45) Date of Patent: *Nov. 17, 2009

(54) DATA FLOW CONTROL AND BRIDGING ARCHITECTURE ENHANCING PERFORMANCE OF REMOVABLE DATA STORAGE SYSTEMS

(75) Inventors: Anthony E. Pione, Irvine, CA (US); Richard M. Andrews, Lake Forest, CA (US)

(73) Assignee: Quantum Corporation, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/205,193

(22) Filed: Sep. 5, 2008

(65) Prior Publication Data

US 2009/0006679 A1    Jan. 1, 2009

Related U.S. Application Data (63) Continuation of application No. 11/182,483, filed on Jul. 14, 2005, now Pat. No. 7,493,430.

(51) Int. Cl.
*G06F 13/10* (2006.01)
*G06F 5/00* (2006.01)
(52) U.S. Cl. .......................................... 710/62; 710/38
(58) Field of Classification Search .................. 710/61, 710/100, 62, 38
See application file for complete search history.

(56) References Cited

U.S. PATENT DOCUMENTS

| | | | |
|---|---|---|---|
| 3,987,975 A | 10/1976 | Jackson | |
| 4,327,879 A | 5/1982 | Tanny | |
| 4,647,994 A | 3/1987 | Irwin | |
| 5,065,262 A | 11/1991 | Blackborow | |
| 5,197,795 A | 3/1993 | Furakawa | |
| 5,204,792 A | 4/1993 | Bryer | |
| 5,280,602 A | 1/1994 | Holt | |

(Continued)

FOREIGN PATENT DOCUMENTS

EP    0 653 759 A2    5/1995

(Continued)

OTHER PUBLICATIONS

United Kingdom Patent Office Search Report from counterpart U.K. patent application No. GB0612863.1, dated Oct. 13, 2006.

(Continued)

*Primary Examiner*—Henry W. H. Tsai
*Assistant Examiner*—Hyun Nam
(74) *Attorney, Agent, or Firm*—Baker Botts L.L.P.

(57) ABSTRACT

A data flow control and bridging architecture that enhances the performance of removable data storage systems. In one implementation, the present invention provides a bypass bus implementation where the data transfer phase associated with select commands occurs directly between the host computing system and the target removable data storage unit. In one implementation, the present invention further provides a data flow and bridging architecture that emulates a removable media interface, such as the ATAPI interface, to the host computing system, and translates these commands for a target removable storage unit that implements a fixed media interface, such as the ATA interface. In yet another implementation, the present invention provides a data flow and bridging architecture that supports the serial ATA interface.

20 Claims, 10 Drawing Sheets

U.S. PATENT DOCUMENTS

| | | | |
|---|---|---|---|
| 5,297,067 A | 3/1994 | Blackborow | |
| 5,454,080 A | 9/1995 | Fasig | |
| 5,483,419 A | 1/1996 | Kaczeus | |
| 5,584,709 A | 12/1996 | Kiat | |
| 5,604,873 A | 2/1997 | Fite | |
| 5,989,045 A | 11/1999 | Kimura | |
| 6,144,526 A | 11/2000 | Ginosar | |
| 6,295,180 B1 | 9/2001 | Sawada | |
| 6,375,484 B1 | 4/2002 | Shimada | 439/330 |
| 6,388,591 B1 | 5/2002 | Ng | |
| 6,540,528 B2 | 4/2003 | Brodsky | |
| 6,545,865 B2 | 4/2003 | Albrecht et al. | |
| 6,546,495 B1 | 4/2003 | Shimura et al. | |
| 6,628,474 B1 | 9/2003 | Parman | |
| 6,633,445 B1 | 10/2003 | Wilke | 360/55 |
| 6,636,942 B2 | 10/2003 | Grecco | |
| 6,699,070 B1 | 3/2004 | Wu | |
| 6,717,762 B1 | 4/2004 | Bauck | |
| 6,722,895 B1 | 4/2004 | Brodsky | |
| 6,733,335 B2 | 5/2004 | Wu | |
| 6,767,235 B2 | 7/2004 | Wu | |
| 6,771,448 B2 | 8/2004 | Blair | |
| 6,790,052 B2 | 9/2004 | Schmidgall | |
| 6,814,583 B1 | 11/2004 | Young | |
| 6,837,718 B2 | 1/2005 | Brodsky | |
| 6,854,982 B2 | 2/2005 | Brodsky | |
| 6,932,649 B1 | 8/2005 | Rothermel | |
| 6,942,524 B2 | 9/2005 | Wu | |
| 6,945,823 B2 | 9/2005 | Lee | |
| 6,957,291 B2 | 10/2005 | Moon | |
| 6,960,089 B2 | 11/2005 | Lee | |
| 6,976,190 B1 | 12/2005 | Goldstone | 714/42 |
| 7,159,063 B2 | 1/2007 | Sivertsen | 710/306 |
| 2003/0096517 A1 | 5/2003 | Ho | |
| 2003/0128454 A1 | 7/2003 | Basham | |
| 2003/0191874 A1* | 10/2003 | Drescher et al. | 710/38 |
| 2003/0207600 A1 | 11/2003 | Ho | |
| 2004/0044802 A1 | 3/2004 | Chiang | |
| 2004/0064598 A1 | 4/2004 | Nakano | |
| 2004/0128422 A1* | 7/2004 | Zayas | 710/305 |
| 2004/0158669 A1* | 8/2004 | Weng et al. | 711/103 |
| 2004/0169996 A1* | 9/2004 | Paul et al. | 361/685 |
| 2005/0066259 A1 | 3/2005 | Cho | |
| 2006/0010285 A1 | 1/2006 | Georgis | |
| 2006/0010458 A1 | 1/2006 | Georgis | |
| 2006/0069820 A1* | 3/2006 | Lee et al. | 710/36 |
| 2006/0101197 A1 | 5/2006 | Georgis | |
| 2006/0103966 A1 | 5/2006 | Georgis | |

OTHER PUBLICATIONS

Texas Instruments Incorporated, SLLS535A, TUSB6250 USB 2.0 to ATA/ATAPI Bridge Controller Data Manual, 125 pages, Jan. 2004.

Definition of IDE from www.xreferplus.com, 2006, Houghton Mifflin Company.

Definition of FAT32 from www.xreferplus.com, 2003, Wiley Publishing Company.

United Kingdom Patent Office Search Report from counterpart U.K. patent application No. GB0612816.9, dated Aug. 31, 2006.

* cited by examiner

DATA FLOW CONTROL AND BRIDGING ARCHITECTURE ENHANCING PERFORMANCE OF REMOVABLE DATA STORAGE SYSTEMS

CROSS-REFERENCE TO RELATED APPLICATIONS

This application is a continuation of U.S. application Ser. No. 11/182,483 filed Jul. 14, 2005, which is incorporated herein in its entirety for all purposes. This application also makes reference to the following commonly owned U.S. patent applications, which are incorporated herein by reference in their entirety for all purposes:

U.S. patent application Ser. No. 10/940,111 in the name of John A. Hamming, entitled "Cartridge Carrier;" and U.S. patent application Ser. No. 10/964,844 in the name of Patrick H. McCormack and John A. Hamming, entitled "Lockable Ejection System and Method."

FIELD OF THE INVENTION

The present invention relates to a data storage device that includes a hard disk drive and, more particularly, to a data storage device in which the hard disk drive is removable from a carrier installed in a host computing system.

BACKGROUND OF THE INVENTION

As the value and use of information increases, individuals and businesses seek additional ways to process and store information. One aspect of this evolution has been a progressively growing demand for increased storage capacity in portable memory devices. With the advent of personal computers and workstations, it is often necessary to remove the medium on which digital data is stored. A user may desire to remove a storage medium to carry it to a different site and/or a different computer system. It may also be desirable to remove the storage medium to a secure location when the stored computer data is sensitive, secret, or a back-up copy is needed. One option is the use of hard disk drives contained in removable cartridges.

Removable hard disk drives are typically housed in a larger shell or cartridge having isolating materials to protect the hard disk drive from dirt or other contaminates, or from a free fall onto a hard surface. Thus, a cartridge 100 (FIG. 1) may be a ruggedized container that houses a hard disk drive. The cartridge is then connected to a larger computer system or network via a carrier installed in a desktop or server system. The carrier typically includes interface and control circuits to operably connect the hard disk drive inserted into the carrier to the motherboard of the host desktop or server system. Either the original cartridge is reinserted or a different cartridge can be inserted back into the carrier installed in the desktop or server. This insertion/removal cycle may occur several times throughout the work day.

Each time the hard disk drive cartridge is inserted into the carrier, it must be electrically and logically interconnected with the host computer by way of a plurality of interfaces connectors. To that end, the carrier bridges the interface between the host computer and the removable hard disk drive. A hard disk drive typically supports a device interface and command set, such as the ATA protocol, which does not support functions directed to removable media. Therefore, one technical challenge to the implementation of removable hard disk systems is presenting an appropriate device interface to the host computer. U.S. Pat. No. 6,633,445, for example, discloses a removable disk storage system where the carrier includes the drive control circuitry, while the removable cartridge includes the disk media and read/write heads. The carrier presents an ATAPI-style interface for communication with the host computer, and converts received commands suitable for an ATA protocol interface to communicate with the hard drive control electronics.

The data storage industry has also devoted much attention to enhancing the speed of data storage operations. While the removable disk drive technologies discussed above operate for their intended objectives, the bridging and translation operations between the host computing system and the target hard disk drive may degrade system performance, such as the speed of read and write operations. In light of the foregoing, a need in the art exists for methods, apparatuses and systems directed to enhancing the speed of data storage operations in removable hard disk drive systems. Embodiments of the present invention substantially fulfill this need.

SUMMARY OF THE INVENTION

The present invention provides methods, apparatuses and systems directed to a data flow control and bridging architecture that enhances the performance of removable data storage systems. In one implementation, the present invention provides a bypass bus implementation where the data transfer phase associated with select commands occurs directly between the host computing system and the target removable data storage unit. In one implementation, the present invention further provides a data flow and bridging architecture that emulates a removable media interface, such as the ATAPI interface, to the host computing system, and translates these commands for a target removable storage unit that implements a fixed media interface, such as the ATA interface. In yet another implementation, the present invention provides a data flow and bridging architecture that supports the serial ATA interface.

DESCRIPTION OF PREFERRED EMBODIMENT(S)

Figure 1:
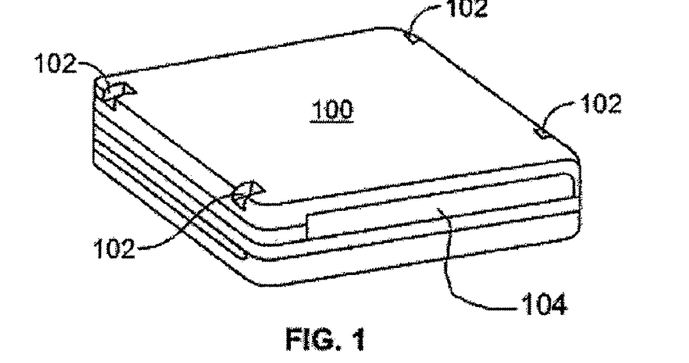
FIG. 1 illustrates an embodiment of a removable cartridge containing a data storage system.
Figure 2A:
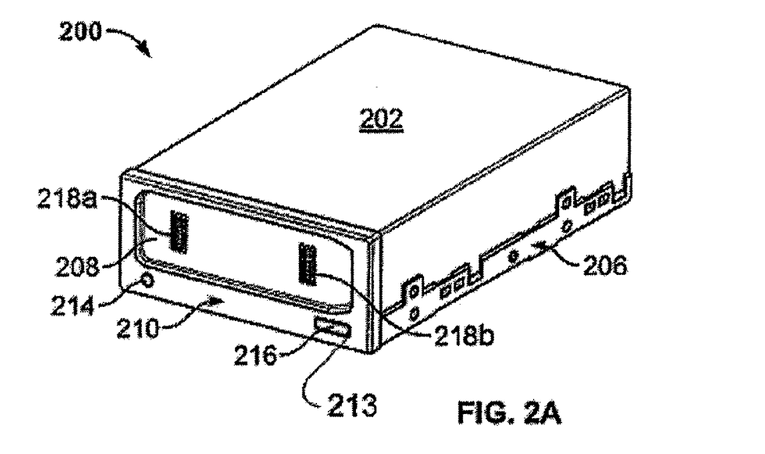
FIGS. 2A and 2B illustrate an embodiment of a cartridge carrier.
Figure 2B:
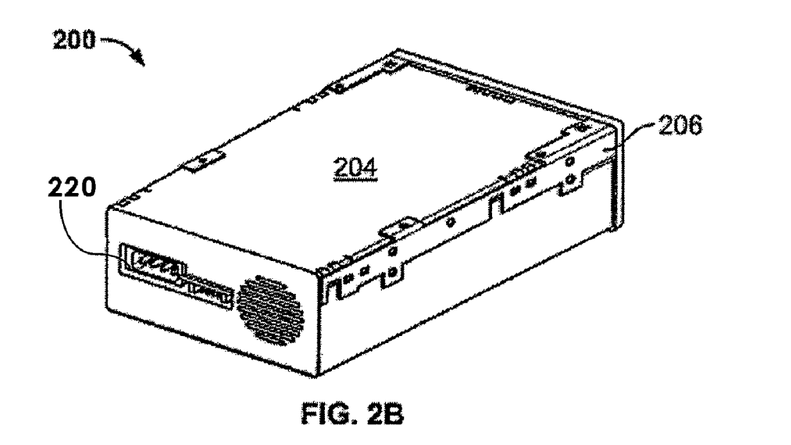
Figure 3:
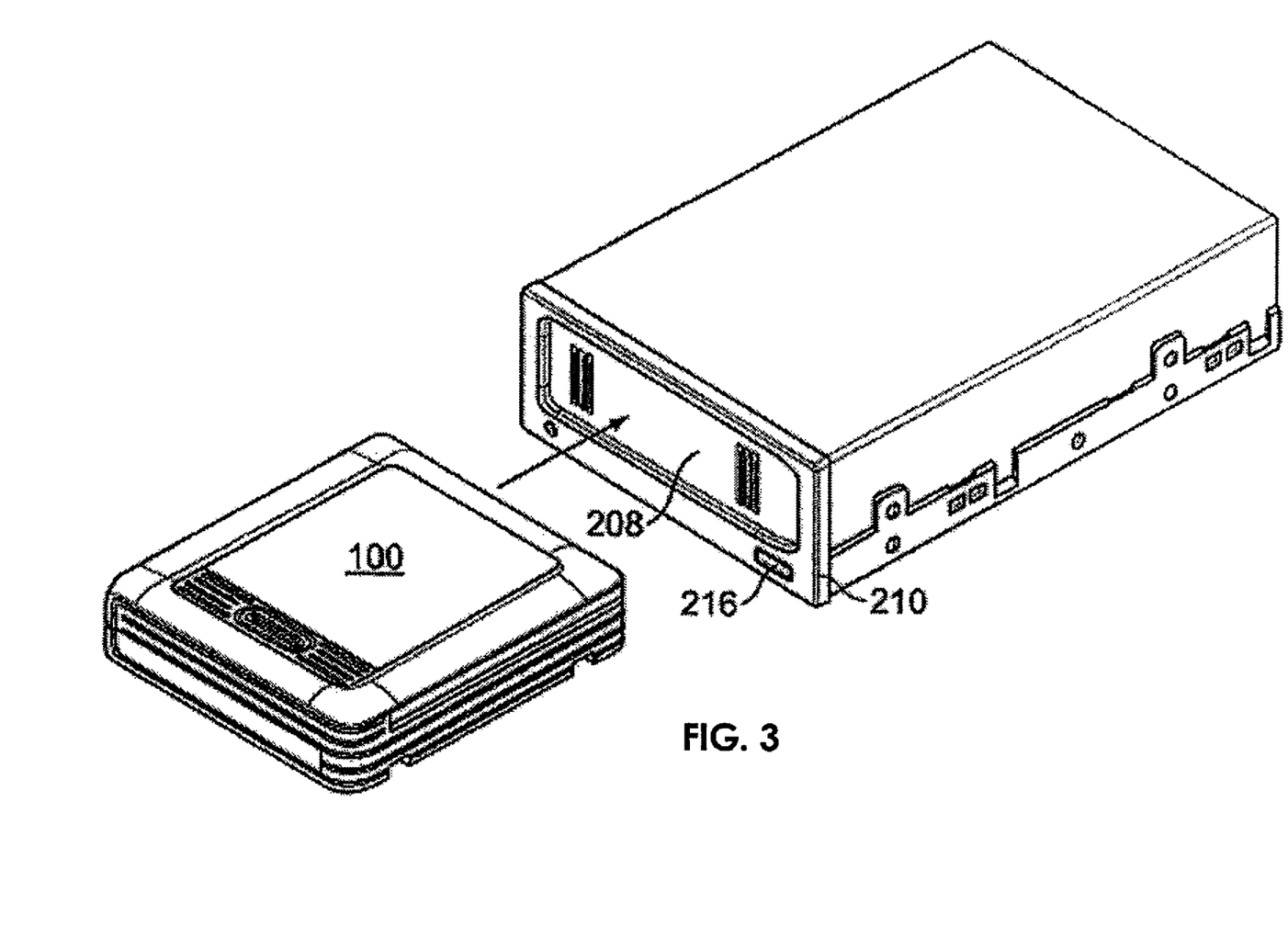
FIG. 3 illustrates insertion of the removable cartridge into the cartridge carrier.

For didactic purposes, an embodiment of the present invention operates in connection with the removable cartridge system illustrated in FIGS. 1, 2A, 2B and 3. The present invention, however, can operate in connection with a vast array of removable media systems. FIG. 1 illustrates an embodiment of a removable cartridge. The cartridge 100 may be any shape or size necessary for its use. The cartridge 100 may have notches 102 and orientation tab channel 104 to assist in the positioning of the cartridge 100 in the carrier and to notify a user that the cartridge 100 is properly inserted into the carrier. FIGS. 2A and 2B are diagrams of a cartridge carrier according to one implementation of the present invention. The cartridge carrier 200, in one implementation, is a docking mechanism into which the cartridge 100 is inserted. As discussed in more detail below, the cartridge carrier 200 provides the interconnection between the motherboard of the host computing device and the target hard disk drive 70 contained in the cartridge 100. The cartridge carrier 200 may have a top cover 202, a bottom cover 204, and a base 206 thereby forming an enclosure. The base 206 connects the bottom cover 204 and the top cover 202 and is positioned within the enclosure. The cartridge carrier 200 may be designed to fit into a 3.5 inch form factor for installation into a bay of a desktop or server box. The carrier 200 may be made of any dimensions necessary, but may have an outside dimension of about between 90-110 mm width, 30-50 mm height, and about 130-190 mm length. As FIG. 2B illustrates, the cartridge carrier 200 includes a connector assembly 220 to allow for a physical connection between the host computing device and the cartridge carrier electronics discussed below. Of course, other implementations are possible. For example, the carrier may be a stand-alone unit, such as a dock that is external from a host computing system.

The cartridge carrier 200, in one implementation, has an opening assembly 210 to provide access to the enclosure and to guide the cartridge 100 into the carrier. The opening assembly 210 may have a door 208, a light pipe opening 214, and an eject button 216. The opening assembly 210 may be contoured to the profile of the carrier 200, and may be larger in height and width than the carrier 200. The opening assembly 210 may be removably connected to the carrier 200 by any means such as snap fit, friction fit, attached with an adhesive, and the like. The door 208 may be designed to be spring closed when a cartridge is not present and may contain a plurality of risers 218*a*, 218*b* to contact the cartridge 100. The ridges reduce wear marks on the door and the cartridge 100. U.S. application Ser. Nos. 10/940,111 and 10/962,484 identified above, provide further details of the mechanical configuration and operation of the cartridge carrier system, such as the physical connection of the interface connectors between the data storage unit of the cartridge, upon insertion, to the corresponding interface connectors of the carrier.

Figure 4:
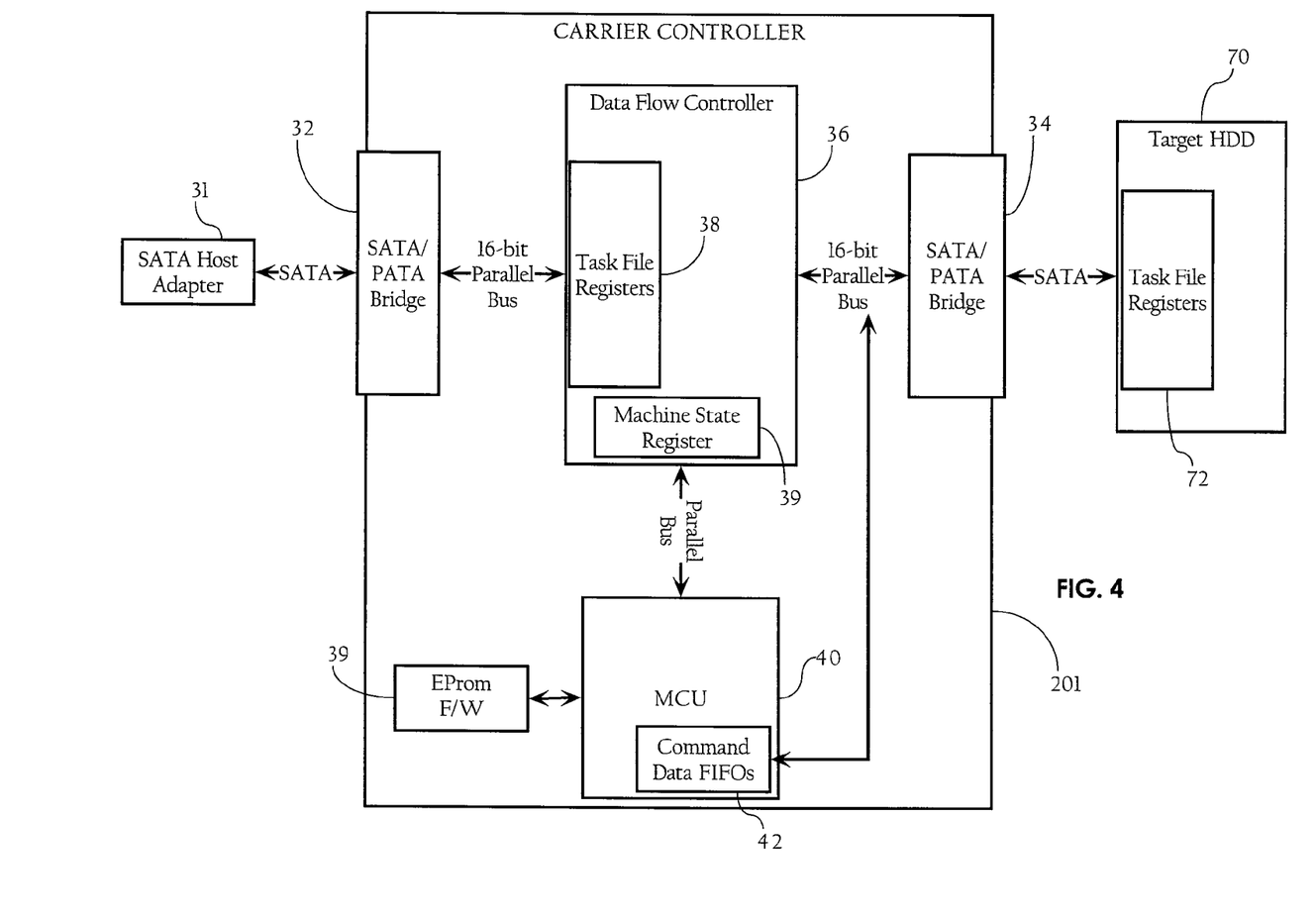
FIG. 4 is a functional block diagram illustrating a high-level system architecture of a removable data storage unit system according to one implementation of the present invention.

FIG. 4 is a functional block diagram illustrating a high-level system architecture, according to one implementation of the present invention, including the main components of a carrier controller 201 and a removable data storage system—here, a target hard disk drive (HDD) 70. In one implementation, the system architecture of the carrier controller 201 generally comprises serial-to-parallel interface bridges 32, 34, data flow controller 36, microcontroller unit (MCU) 40 and an electronically programmable read-only memory (EEPROM) circuit 39. As FIG. 4 illustrates, a cartridge-based hard disk drive (HDD) 70 (contained in cartridge 100) connects to the serial-to-parallel interface bridge 34, while the host adapter 31 on the motherboard of the host computer or server connects to the serial-to-parallel interface bridge 32. In one implementation, the target HDD 70 contained in cartridge 100 is a serial ATA (SATA) drive, which implements the standard ATA-6 command set. For example, the target HDD 70 may be a Serial ATA hard disk drive (2½") in capacities ranging from 40 GB to 120 GB. In one implementation, the target HDD 70 is formatted with a FAT32 file system. The FAT32 file system is recognized by several operating systems including Microsoft® Windows®, Novell NetWare®, Apple MAC OS-X®, and Linux. Of course, the target HDD 70 may support larger or smaller data capacities, and other file systems. In one implementation, the target HDD 70 includes a set of registers implementing an ATA task file 72, which is a conventional set of input/output registers having defined locations in memory to which both the host and target side have access. In one implementation, the serial to parallel interface bridge 34, therefore, provides the host mode SATA interface connection to the target SATA HDD 70.

In one implementation, the electronic components of the carrier controller 201 translate SATA-based ATAPI block commands/status responses from the SATA host adapter 31 to SATA-based ATA commands on the SATA drive interface of target HDD 70. In one implementation, the carrier controller 201 contains two SATA interfaces provided by interface bridge circuits 32, 34: the Carrier-to-Motherboard SATA interface, and the HDD-to-Carrier (Hot plug) SATA interface. Typically, the Carrier-to-Motherboard SATA interface 32 is connected at the time of carrier installation to the host computing device with the system power off, and presents a SATA device-mode physical interface to the host computing system. The HDD-to-Carrier (Hot plug) SATA interface is designed to allow insertion and removal of the cartridge 100 when carrier power is applied, and presents a SATA host-mode physical interface to the target HDD 70. The SATA/PATA interface bridges 32 and 34, in one implementation, are integrated circuits that convert SATA to Parallel ATA (PATA), and vice versa. Typically, the bridge circuits include processing logic and buffers to perform the requisite serial-to-parallel conversions. Any suitable SATA/PATA bridge circuit can be used, such as the 88SA8040 Serial ATA Bridge Chip offered by Marvell Semiconductor, Inc. of Sunnyvale, Calif.

As FIG. 4 illustrates, a 16-bit parallel bus connects SATA/PATA bridge 32 to data flow controller 36. Data flow controller 36, in one implementation, implements an ATA/ATAPI task file maintained by task file register 38. The SATA/PATA bridge 32 maps the SATA connection with SATA host adapter 31 to the ATA/ATAPI task file register 38 maintained by the data flow controller 36. A second 16-bit parallel bus connects data flow controller 36 to SATA/PATA bridge 34. An additional parallel bus connects data flow controller 36 to microcontroller unit 40. Furthermore, as FIG. 4 illustrates, microcontroller unit 40 is also connected to the 16-bit parallel bus between data flow controller 36 and interface bridge 34 to allow for receipt and transmission of command data from and to the target HDD 70. As discussed in more detail below, data flow controller 36 is operative to selectively direct the flow of data to either microcontroller unit 40 or SATA/PATA bridges 32, 34. Data flow controller 36 can be implemented in a variety of physical configurations. For example, data flow controller 36 can be a programmable logic circuit, such as a field-programmable gate array (FPGA), a complex programmable logic device (CPLD), or an application-specific integrated circuit (ASIC). In one implementation, the data flow controller 36 routes UDMA or DMA bursts between the bridge circuits 32 and 34 to enhance the speed of data transfer between the host system and the target HDD 70, but routes ATAPI commands to the microcontroller unit 40 for translation and execution.

Microcontroller unit 40, as discussed more fully below, intercedes in command block interpretation from the ATAPI command set and interface presented to host adapter 31 to the ATA command set and interface presented to target HDD 70. Microcontroller unit 40, in one implementation, is a microcontroller comprising an 8051 CPU core, random access memory (RAM), command data FIFOs 42 for storing command data, as well as peripheral and communications ports. A suitable microcontroller that can be used in an embodiment of the present invention is manufactured by Cypress Semiconductor Corporation of San Jose, Calif. under the model number CY7C68013. Of course, other CPU cores and other microcontroller units can be used. In one implementation, EEPROM circuit 39 stores firmware that is loaded into the RAM of microcontroller unit 40 at boot time. As discussed above, microcontroller unit 40 and data flow controller 36 communicate, in one implementation, over a parallel bus using a set of registers. In one implementation, the command data FIFOs 42 provide a buffer for command data, and comprise three separate FIFO structures. In one implementation, the command data FIFOs 42 include a first FIFO for receiving ATAPI command data from the host system, a second FIFO for receiving ATA command data from the target HDD 70, and a third FIFO that stores command data for transmission to either the target HDD 70 or the host system. For example, microcontroller unit 40 may translate an ATAPI command received from the host system and stored in a first FIFO of the command data FIFOs 42, and formulate and store an ATA command in memory for transmission to the target HDD 70 via interface bridge 34.

As discussed in more detail below, data flow controller 36, in one implementation, maintains a machine state register 39 that the data flow controller 36 and the microcontroller unit 40 use to coordinate the processing of commands received from the host computing device. In one implementation, the microcontroller unit 40 and data flow controller 36 together read and write to a set of registers, such as a machine state register 39, that provide the communications interface between the two components and indicate the status of command processing. As discussed above, the data flow controller 36 maintains the ATAPI task file register 38 and responds to state changes in the task file register 38, such as a packet command being written into the control register of the task file 38. In some implementations, state changes in the ATAPI task file cause state changes in the machine state and other registers. For example, the machine state register 39, in one implementation, is a 4-bit register that state of which corresponds to various possible command processing states, such as an idle state, command states, data transfer states, and the like (see FIGS. 6A and 6B, and corresponding description below).

Figure 5A:
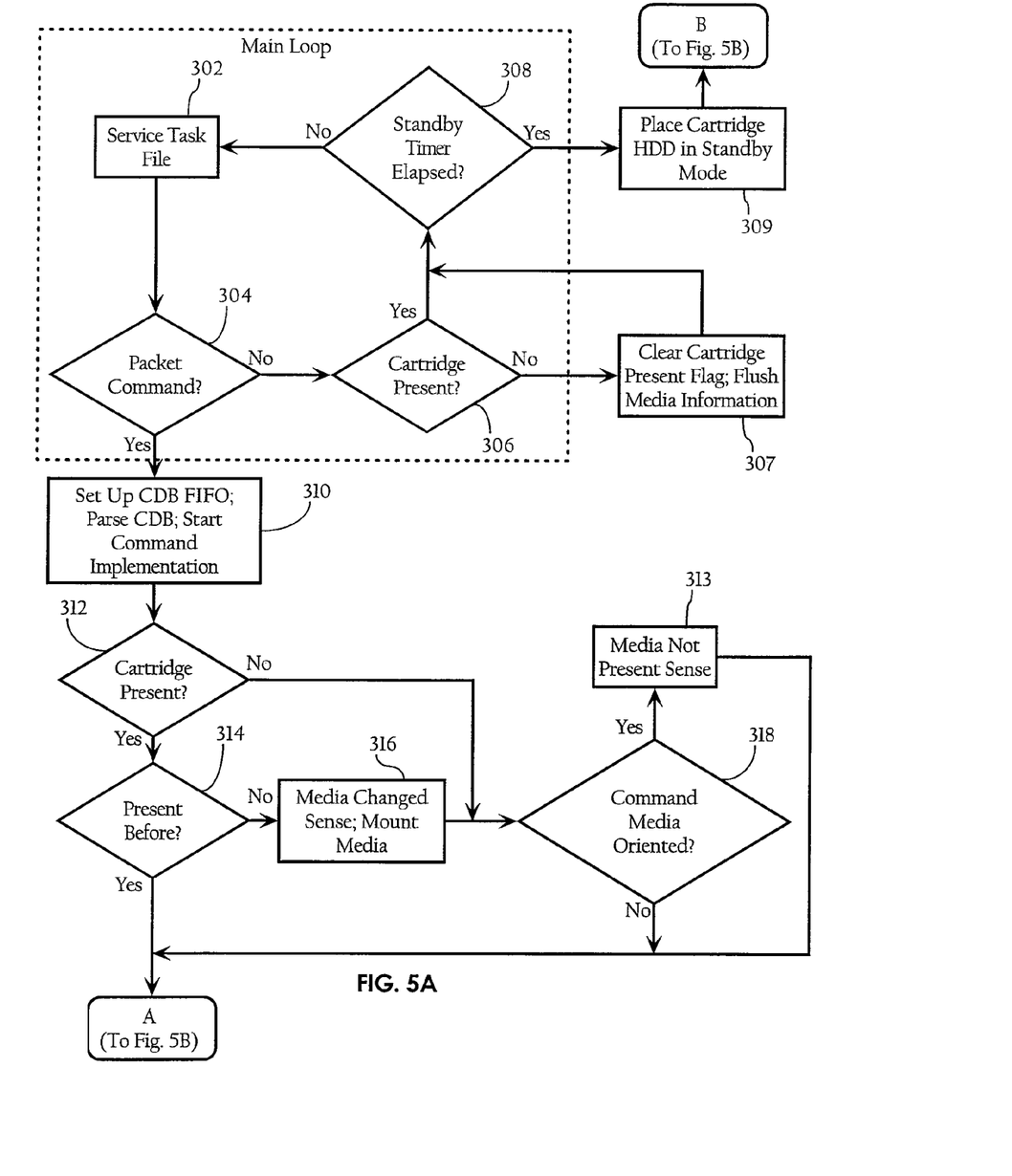
FIGS. 5A and 5B together provide a state diagram illustrating operation of the carrier control logic.
Figure 5B:
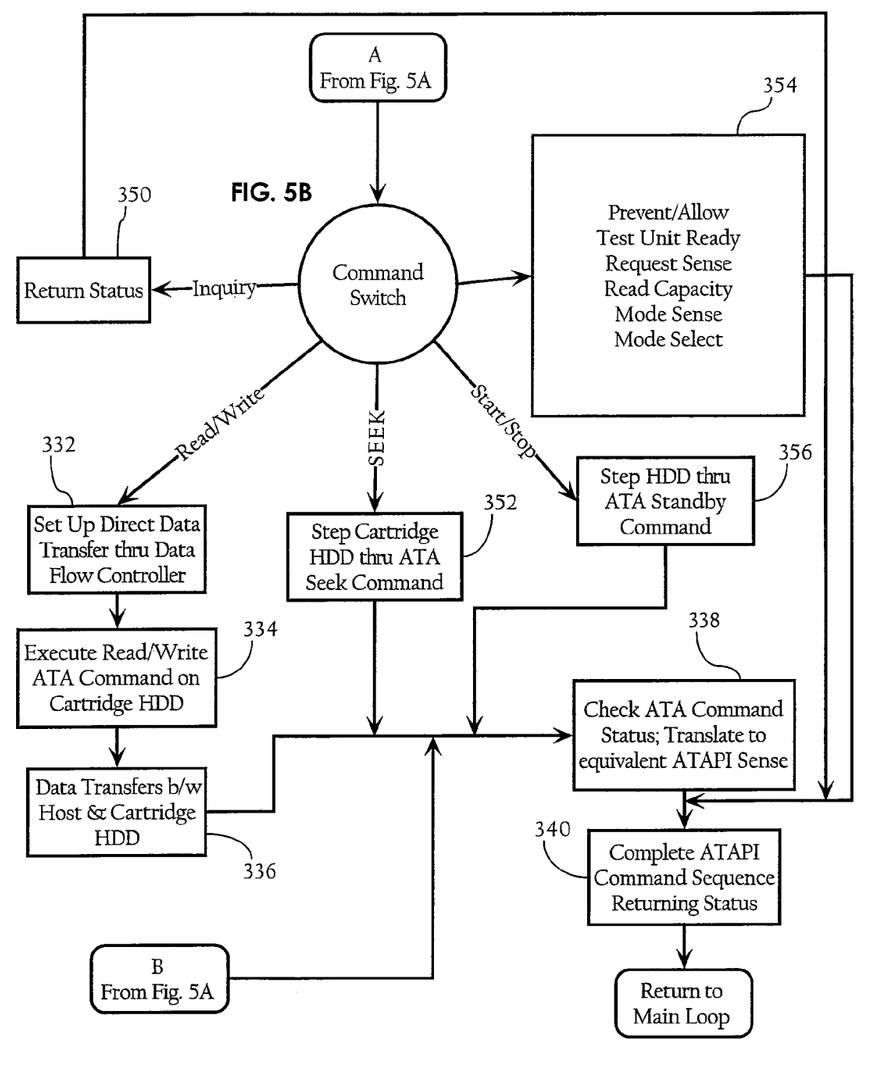

FIGS. 5A and 5B together provide a state diagram illustrating operation of the carrier controller 201 according to one implementation of the present invention. As FIG. 5A illustrates, the carrier controller 201 executes a main loop that services the registers of the task file 38 until a command packet is detected (304), or a standby timer has elapsed (308). The standby timer is a counter that is initiated after the carrier controller 201 returns to an idle state. If the standby timer elapses, the carrier controller 201 issues commands to the target HDD 70 to place it in standby mode in order to conserve power (309). As FIG. 5B illustrates, after the standby command is issued, the carrier controller 201 checks the status of the ATA command and translates it to the equivalent ATAPI sense (338). The carrier controller 201 completes the ATAPI command sequence, returns the status to the task file register 38 (340) and returns to the main loop. In another implementation, the target HDD 70 itself implements a standby mechanism that operates autonomously relative to the carrier controller 201, obviating the need for implementation of standby functionality on the carrier controller 201. As FIG. 5A illustrates, the carrier controller 201 also checks for the presence of the target HDD 70 (306). If the cartridge is not present, the carrier controller 201 clears the cartridge present flag and flushes the media information stored in memory of the MCU 40 (307).

If a command packet is written into the task file register 38 (304), the carrier controller 201 prepares the command block (CDB) FIFO in the microcontroller unit 40 to receive the command packet bytes contained in the command block, parses the command block and begins command implementation (310). In one implementation, the carrier controller 201 checks whether the target HDD 70 is present (312). If the target HDD 70 is present, the carrier controller 201, in one implementation, checks whether the target HDD 70 was previously present (314). In one implementation, this check is performed by accessing a flag maintained by the microcontroller unit 40 that, when set, indicates that the last time it was checked a target HDD was loaded into the carrier 200. If the target HDD 70 was not previously present, the carrier controller 201 returns a "media changed" sense code and mounts the new target HDD 70 reading the ATA ID, features set, sensing the write protection options and (in one implementation) performing a password exchange to authenticate the target HDD 70.

If the target HDD 70 is not present, and the received command requires access to the target HDD 70 for execution (318), the carrier controller 201 queues a "media not present" sense code in memory of the MCU 40 (313). For example, a read or write command requires access to the target HDD 70, while an ATAPI "inquiry" command does not. As FIG. 5A illustrates, if the received command requires access to target HDD 70 and it is not present, the carrier controller 201 returns an error status to the task file register 38. Otherwise, carrier controller 201 processes the command as illustrated in FIG. 5B. In one implementation, the ATAPI sense codes are stored in the memory of the MCU 40. In one implementation, if the sense code corresponds to an error condition, an error bit in the task file register 38 is set to indicate the presence of a sense code to the host system. The host system ultimately obtains the stored sense code by issuing a Request Sense command.

FIG. 5B shows various ATAPI commands and the actions performed in response to these commands. For example, in response to an ATAPI INQUIRY (INQ) command, the carrier controller 201 returns parameter data based on the configuration of the firmware implemented by microcontroller unit 40 (350), such as the carrier firmware identifier, a carrier serial number, etc. In response to a start/stop command, the carrier controller 201 steps the target HDD 70 through the ATA Standby command (354). Similarly, the carrier controller 201, in response to a SEEK command, steps the target HDD 70 through an ATA Seek command (352). Block 354 in FIG. 5B illustrates additional ATAPI-based commands, such as PREVENT/ALLOW, TEST UNIT READY, REQUEST SENSE, READ CAPACITY, MODE SENSE and MODE SELECT. The carrier controller 201 returns queued sense conditions in response to the REQUEST SENSE command. In response to the READ CAPACITY command, the carrier controller 201 returns the media capacity acquired from the identification data obtained when the target HDD 70 was mounted. In response to the MODE SENSE command, the carrier controller 201 returns data that depends on the page(s) selected. For example, some of the data corresponding to the pages may be password parameters, while other data types may be connection speed data. In one implementation, connection speed data provided by carrier controller 201 is arbitrary data provided merely to satisfy the request. The response of the carrier controller 201 to the TEST UNIT READY command depends on the presence of the target HDD 70. The carrier controller 201 also supports the PREVENT/ALLOW (media removal) command to provide a locking mechanism similar to conventional ATAPI devices. In one implementation, the carrier controller 201 takes no action in response to the MODE SELECT command, merely discarding the received data (with the possible exception of password command data).

In response to a READ or WRITE command, the carrier controller 201 sets up a direct transfer of the data corresponding to with the command between the SATA host adapter 31 and the target HDD 70 via the interface bridge circuits 32, 34 and the data flow controller 36 (334), as discussed more fully below. The carrier controller 201 also translates the command to an ATA command and transmits it to the target HDD 70 via the SATA/PATA bridge circuit 34 (334) to prepare the target HDD 70 for command execution. Thereafter, the data flow controller 36 performs various operations to allow for data transfer directly between the SATA host adapter 31 and the target HDD 70 without intervention by the microcontroller unit 40. As FIG. 5A illustrates, the carrier controller 201 also checks the status of the ATA command and translates the status to the equivalent ATAPI sense (338), and completes the ATAPI command sequence, returning the status to the SATA host adapter 31 (340). In this manner, data transfer speeds between the host system and the target HDD 70 are improved, as the intervention by the microcontroller unit 40 and the overhead associated with its operation are reduced. The intelligent, dual bridging system architecture also minimizes host system configuration issues and does not require unique driver development; that is, some implementations of the present invention can be used with standard SATA drivers. Placement of the carrier controller 201 in the SATA data stream ensures that the operating system host driver retains SATA communication to the carrier, regardless of whether a target HDD has been inserted.

Figure 6A:
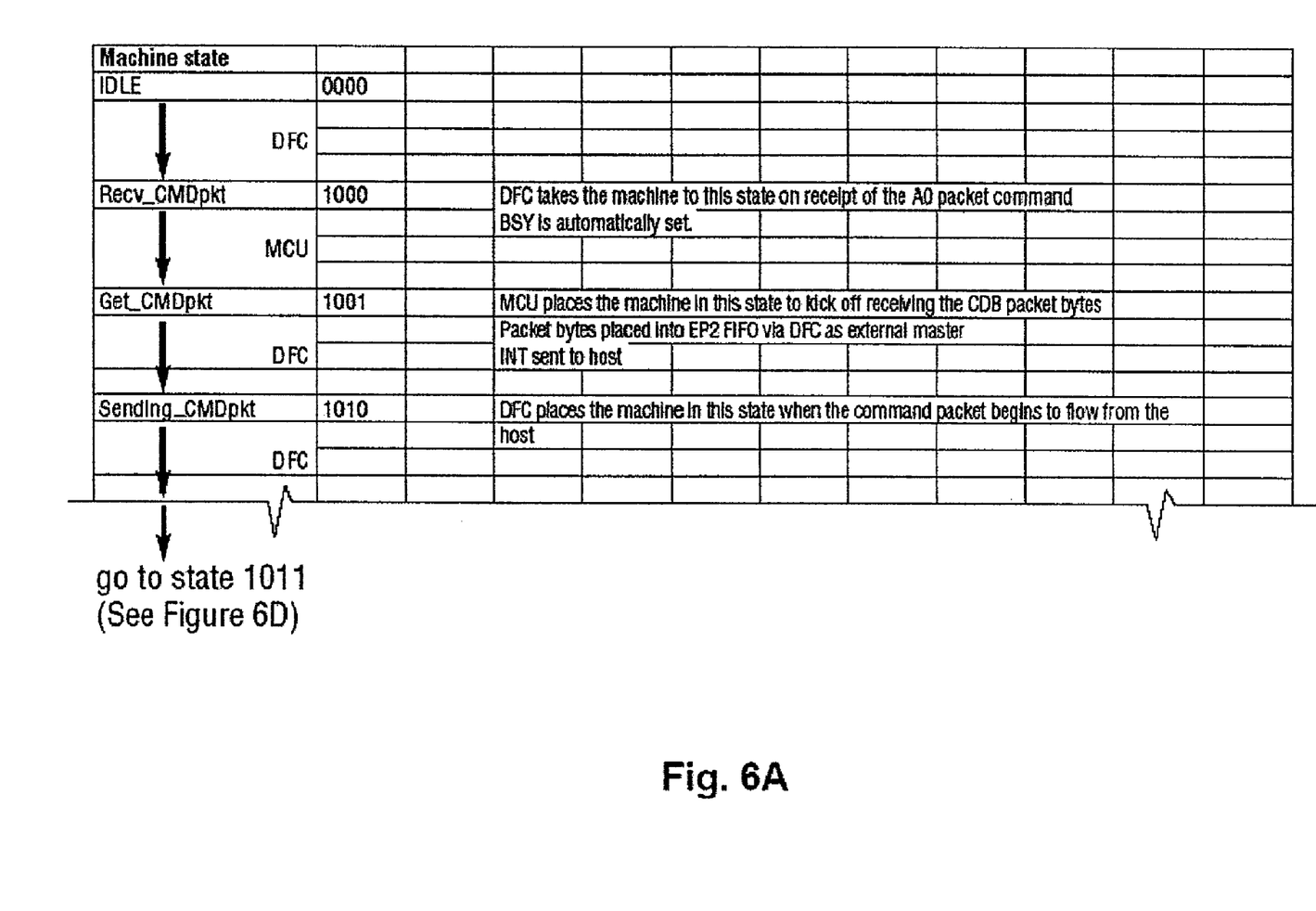
FIGS. 6A, 6B, 6C, 6D and 6E are process flow and machine state diagrams illustrating how the data flow controller and microcontroller coordinate command processing.
Figure 6B:
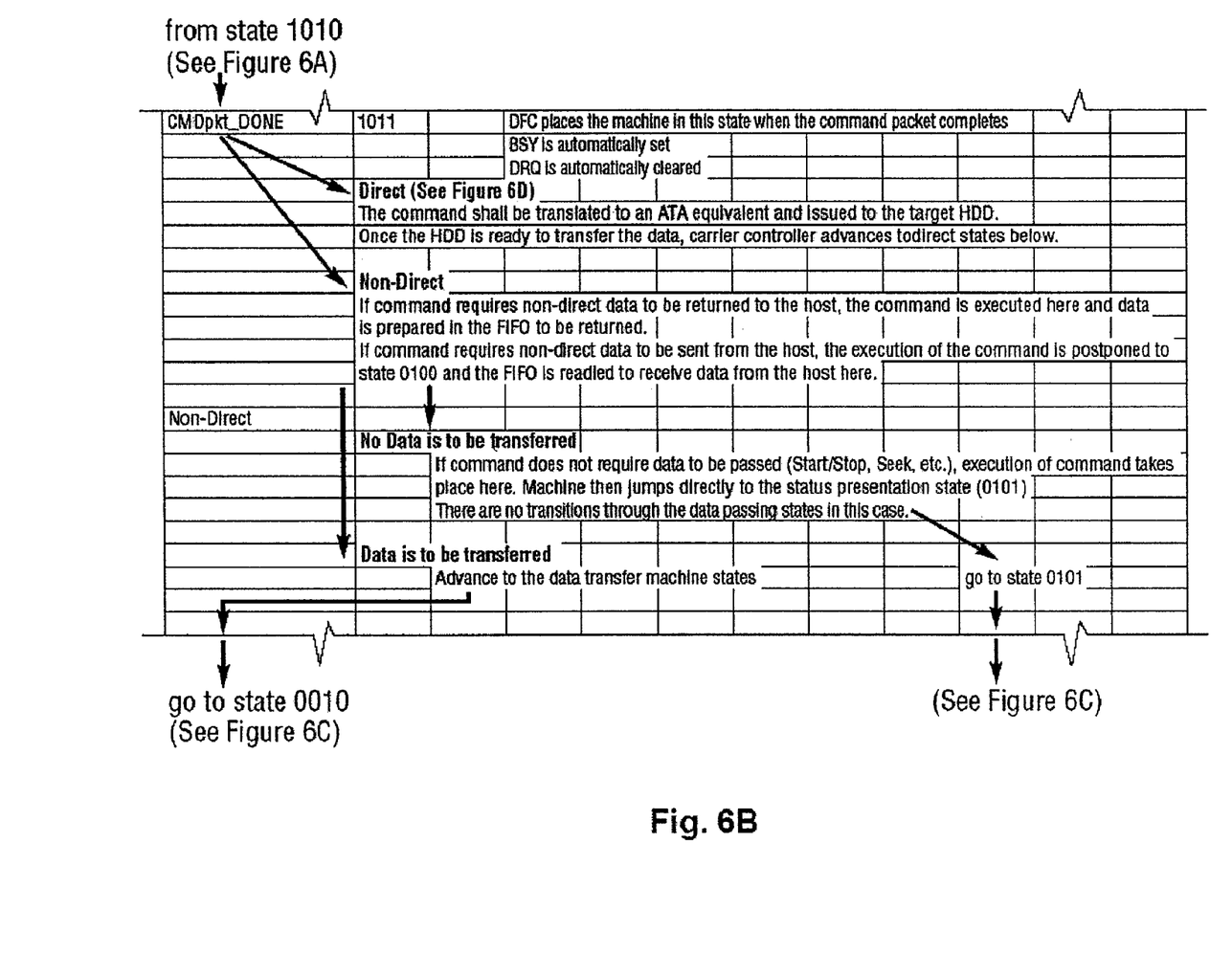
Figure 6C:
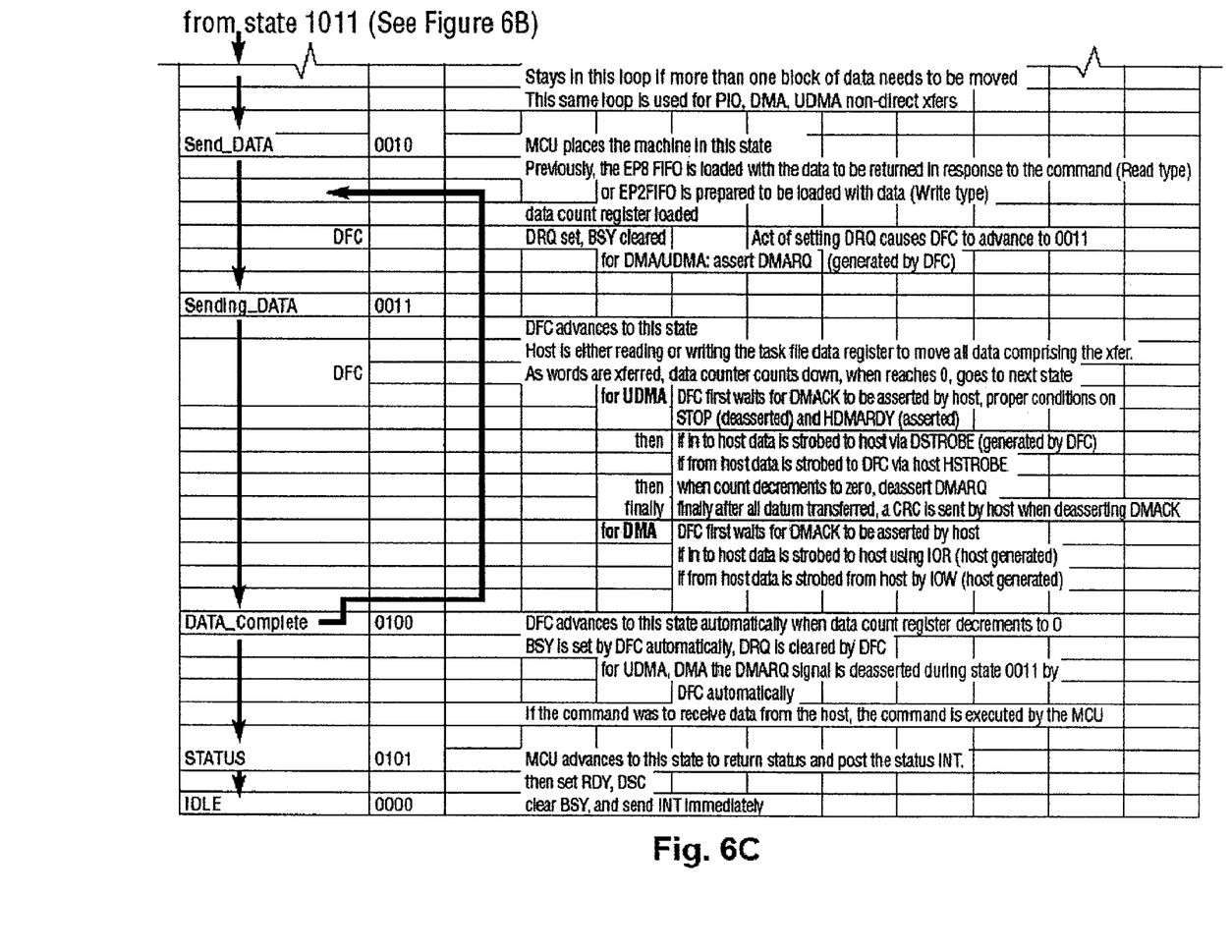
Figure 6D:
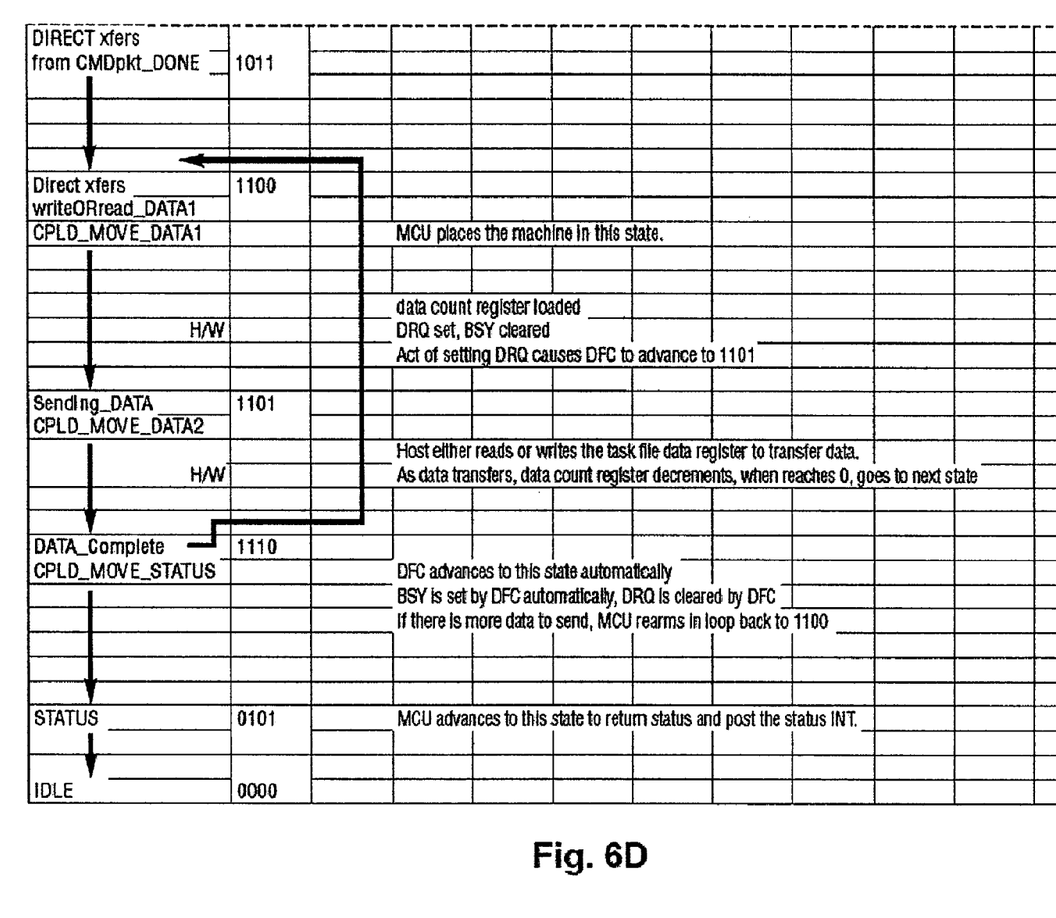
Figure 6E:
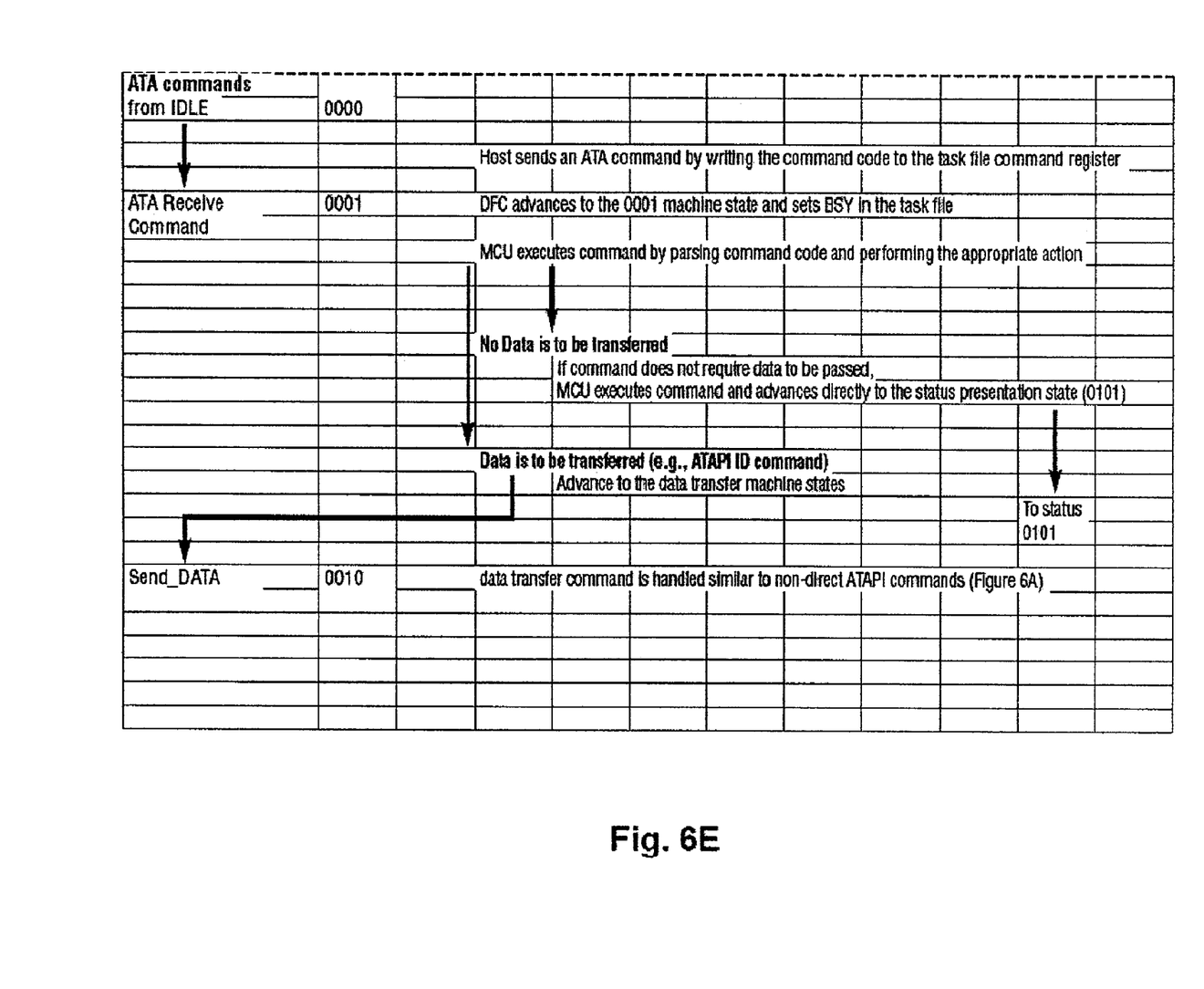

FIGS. 6A, 6B, 6C, 6D and 6E illustrate the machine state register transitions and process flow implemented by data flow controller (DFC) 36 and microcontroller unit (MCU) 40 executing the firmware stored in RAM. As the following description provides, the carrier controller 201 is capable of processing both ATA and ATAPI commands received from the host. In addition, carrier controller 201 processes certain ATAPI commands differently depending on whether data transfer occurs directly between the host system and the target HDD 70, or whether the MCU 40 intervenes in the data transfer associated with the command. FIGS. 6A through 6C illustrate the machine state register transitions and process flow associated with processing ATAPI commands, while FIG. 6E illustrates the machine state register transitions and process flow associated with processing ATA commands. FIG. 6B, more specifically, illustrates the process flow associated with processing ATAPI commands where, after the command data is received, data transfer occurs directly between the host system and the target HDD 70 via the data flow controller 36.

As FIG. 6A illustrates, the machine state register 39 is set to 0000 while in the IDLE state. When the data flow controller 36 receives a packet command (A0h) on the command register of task file 38, the data flow controller 36 sets the machine state register 39 to the Recv_CMDpkt state (1000). On detecting this state, the microcontroller unit 40 reads the task file registers and takes appropriate action to execute the command. In one implementation, on the following clock signal, the data flow controller 36 sets the BSY bit in the status register of the task file 38 and remains in this state until the microcontroller unit 40 takes action on the command. In one implementation, the MCU 40 sets the machine state register 39 to the Get_CMDpkt state (1001) to initiate receipt of the command packet bytes from the SATA host adapter 31. In one implementation, the MCU 40 also programs the data count register maintained by the data flow controller 36 with the count of words to be transferred, which is the command packet length (12 bytes or 6 words for ATAPI commands). The MCU 40 also allows external access to the command data FIFOs 42 to allow the data flow controller 36 to write the command packet data into a FIFO of the command data FIFOs 42. Lastly, the MCU 40 enables the transition to the Sending_CMDpkt state (1010) by setting the DRQ bit to 1 and then the BSY bit to 0 in the status register of the task file 38, causing the SATA host adapter 31 to strobe the data into the command data FIFOs 42 via the data registers of the task file 38.

When the command packet bytes are written to the data registers of the task file 38, the data flow controller 36 writes them directly to a FIFO of the command data FIFOs 42, decrementing the data count register as each word is received. As FIG. 6A illustrates, when the command packet transfer is complete, the data flow controller 36 sets the DRQ bit to 0 and the BSY bit to 1 in the status register of the task file 38. The data flow controller 36 also advances the state of the machine state register 39 to the CMDpkt_DONE state (1011), refer to FIG. 6B.

The MCU 40 then reads the command packet stored in the command data FIFOs, parses the command and takes action in response to it. According to one implementation of the invention, carrier controller 201 processes ATAPI commands in two different manners. As discussed above, carrier controller 201 processes certain commands, such as READ and WRITE commands, to allow for direct transfer corresponding to the command between the target HDD 70 and the host system. As discussed more fully below, the MCU 40 translates the READ or WRITE command into an equivalent ATA command and issues the command to the target HDD 70. Once the target HDD 70 is ready for the data transfer, carrier controller 201 advances to the process flow illustrated in FIG. 6B, discussed more fully below.

Carrier controller 201 handles other (non read/write block) ATAPI commands in a different, non-direct manner. In addition, even as to ATAPI commands handled in a non-direct manner, some ATAPI commands require the transfer of data to or from the host system, while others (such as, START/STOP, SEEK, etc.) do not. As FIG. 6A illustrates, if the ATAPI command does not require data transfer to/from the host, the MCU 40 processes and executes the command and advances the machine state register to the status presentation state (0101).

If the ATAPI command requires data transfer to or from the host system, the process flow illustrated in FIG. 6A is executed. In one implementation, the MCU 40 sets the machine state register 39 to the Send_DATA state (0010) to indicate that data is to be returned to, or accepted from, the SATA host adapter 31. The Send_DATA state, in one implementation, is intended primarily to process non-direct commands, such as ATAPI INQ, MODE SENSE/SELECT, REQUEST SENSE, etc. Prior to setting this state, the MCU 40 programs the data count register maintained by the data flow controller 36 with the count of words (16 bit) to be transferred. In addition, prior to setting the Send_DATA state (0010) (see FIG. 6C), the MCU 40 prepares the appropriate data in a FIFO of the command data FIFOs 42, if data is to be transferred from the host. The MCU 40 may perform a number of operations prior to setting the Send_DATA state. For example, part of the process of emulating an ATAPI ID command may be to send an ATA ID command to the target HDD 70, receiving and parsing the return data to compose a response that is stored in another FIFO of the command data FIFOs 42 for transmission to the host system via the registers of the task file 38.

As FIG. 6A illustrates, after setting the Send_DATA state (0010), the MCU 40 clears the BSY bit and sets the DRQ bit in the status register of the task file 38. In response to the Send_DATA state and setting of the DRQ bit, the data flow controller 36 sets up the control signals to read the data from, or write the data to, the command data FIFOs 42 and sets the machine state register 39 to the Sending_DATA state (0011). If the DMA bit is set to 0, the data flow controller 36 uses a PIO protocol with the host. If the DMA bit is set to one, the data flow controller 36 utilizes a DMA protocol to transfer the data. In one implementation, the direction of data transfer is determined from the Direction bit (e.g., 0—in, writing command, 1—out-reading command).

Setting the DRQ bit causes the data flow controller 36 to advance the machine state register 39 to the Sending_DATA state (0011). In this state, the host either writes or reads data from the registers of task file 38 until the data transfer is complete. The data flow controller 36 decrements the data count register as each word is transferred. If UDMA transfer mode is used, the data flow controller 36 waits for the host to assert DMACK, as well as proper conditions on STOP (deasserted) and HDMARDY (asserted). Then, if data is to be transferred to the host, the data flow controller 36 strobes the host via DSTROBE. If the data is to be transferred from the host, the host strobes the data into the task file register 38 via HSTROBE.

As the UDMA transfer progresses, the data count register counts down each word that is sent. During the transfer, either the host of the data flow controller 36 may force the suspension of the UDMA at any time via the use of the bus control signals (STOP/DMACK from the host, and DDMARDY/DMARQ from the data flow controller 36. This has the effect of breaking the full UDMA transfer into composite segments or bursts. At each of these suspensions of the UDMA and at the instant that the host deasserts DMACK (which signals the conclusion of the current UDMA segment), a CRC value for that segment of the UDMA is sent by the host to the data flow controller 36. This CRC is computed across the data that has been sent in the current segment of the UDMA. The data flow controller 36 compares this CRC to one internally computed to validate the correctness of the data that has been transferred. In the implementation described herein, CRC values flow from host to the data flow controller regardless of whether the command was returning data to the host or receiving data from the host. There is no set size for the segments and it is possible to send the entire transfer as a single segment.

Similarly, if DMA transfer mode is used, the data flow controller 36 waits from the host to assert DMACK. The host strobes data into the registers of task file 38 using IOR, and strobes data from the registers of the task file using IOW. As the data is transferred, the data flow controller 36 decrements the data count register until it reaches zero, and advances the machine state register to the DATA_Complete state (0100). The data flow controller 36 also sets the BSY bit to 1 in the status register of the task file 38 and clears the DRQ bit (no more data to transfer). Additionally, the loop illustrated in FIG. 6A is repeated if there are additional blocks of data to be transferred. If the received command requires data from the host, the MCU 40 then parses the command stored in a FIFO of the command data FIFOs 42 and prepares to execute the command. When the host is done transferring the data comprising the command, the command is executed.

After data transfer is complete and the command executed, the MCU 40 advances to the STATUS state (0101). The MCU 40 uses the STATUS state (0101) to indicate that the status for the last command is ready. Prior to setting the machine state register 39 to the STATUS state, the MCU 40 sets certain information in the registers of task file 38. For example, if an error is detected in connection with the command, the MCU 40 sets the error bit in the status register of the task file 38, queues up a sense condition (if appropriate), and sets the sense type in the error register of the task file 38. If no error is detected, the MCU 40 assures that the ERR bit and the error register in the task file 38 are cleared. In addition, the MCU 40 then sets the HostINT bit in the task file 38 to generate a status interrupt to the host device, and clears the BSY bit, allowing the host to read other registers in the task file to check on command processing and the like. In one implementation, the data flow controller 36 clears the HostINT bit after the status register of the task file 38 is read and sets the machine state register 39 to the IDLE state.

As discussed above, certain commands, such as READ and WRITE commands, involve direct data transfer between SATA host controller 31 and target HDD 70. As the following illustrates, in some direct command processing states, certain interface signals from the target HDD 70 are passed directly through to the host side interface of the carrier controller 201. For example, data flow controller 36, during direct DMA/HDMA data transfers, patches the host side DMARQ signal to the target side DMARQ signal. For purposes of description below, the use of H_ (e.g., H_DMARQ) in connection with an interface signal identifier refers to the host side interface signal, while the use of T_ (e.g., T_DMARQ) refers to the target side interface signal. FIG. 6D sets forth the process flow and machine state register codes for transferring data directly without intervention of the MCU 40. In one implementation, the MCU 40 sets the machine state register 39 to the writeORread_DATA1 state (1100) after detection of an ATAPI WRITE or READ command to initiate operations that set up direct communication between the SATA host adapter 31 and the target HDD 70. Removing the MCU 40 from the data transfer path facilitates high performance data transfer and increases data rates.

Prior to entering the writeORread_DATA 1 state (1100), the MCU 40 prepares the target HDD 70 to process the READ or WRITE command. In one implementation, the MCU 40 prepares an equivalent DMA/UDMA or PIO read or write ATA command and sends it to the target HDD 70 in order to prepare it to read, or to write, the data. For programmed input/output (PIO) transfers, the MCU 40 transmits an ATA PIO-based read or write command to the target HDD 70. The target HDD 70 processes the command and sets the DRQ bit, and clears the BSY bit, in the status register of its task file 72. On detecting this state as well as verifying the direction bit, the data flow controller 36 directly interfaces the SATA host adapter 31, via the registers of task file 38, to the data registers of the target HDD 70. In one implementation, the data flow controller 36 appropriately interfaces the host side control signals H_DIOW# and H_DIOR# as well as H_IORDY, directly through to the equivalent signals of the target HDD 70. Beyond the data register, in one implementation, when the host adapter 31 accesses any other task file registers, it will access those within the data flow controller 36 (i.e., task file 38). For example, in one implementation, the MCU 40, after setting the Sending_DATA state, forces the address on the target HDD side to 1F0 (A0=A1=A2=0, CS0=0, CS1=1), which allows the host to read or write the data register of the target HDD 70 directly. The MCU 40 enables the data transfer, as discussed above, by setting the DRQ bit to 1 and the BSY bit to 0 in the status register of the task file 38. During the data transfer, the 16 bit FD<15:0> bus is passed through the data flow controller logic to the host bus H_DD0-15 (direction depending on the setting of direction bit). While in the Sending_DATA state (1101), SATA host adapter 31 and the target HDD 70 transfer data directly.

During the data transfer, the data flow controller 36 decrements the data count register until it reaches 0. In one implementation, the data flow controller 36 can apply a timeout mechanism to check the progress of the data transfer command. The data flow controller 36 can apply a recovery method if the data count register has not been decremented after a time out. In either transfer mode (DMA or PIO), as each word is strobed through the interface, the data flow controller 36 decrements the data count register. When the data count register reaches 0, the data flow controller 36 sets the BSY bit in the status register of the task file 38, and moves the machine state register to the to DATA_Complete state (1110). In addition, if the MCU 40 detects that the command is processing, but that the SATA carrier has been dropped (indicating removal of the target HDD), the MCU transitions the machine state register 39 to an error state (1111).

As FIG. 6B indicates, the DATA_Complete state indicates that the command has been completed. In one implementation, the CRC value is exchanged directly from the host to the target HDD 70 to validate the transfer. After detecting the DATA_Complete state, the MCU 40 validates the data counter registers and any other machine state information to identify possible errors. The MCU 40 then checks the target HDD status (which incorporates a CRC validation check) and mirrors this status to the host through the task file. If there are no errors, the MCU 40 clears the error bit in the status register and the error register of the task file 38. The MCU 40 then sets the machine state register 39 to the STATUS state (0101) to complete the transfer. Otherwise, if the MCU 40 detects an error, it queues the appropriate sense condition, places the sense key in the error register of the host task file 38, and sets the host task file error bit in status register. The MCU 40 then sets the state to 0101 (STATUS) to complete the transfer on error. As discussed above, the MCU 40 also clears the BSY bit, and sets the INT bit.

To support DMA transfers, the data flow controller 36 interfaces a variety of control signals between the host and the target HDD 70. For example, the host control signals H_DMACK# are patched through to the target HDD T_DMACK# input. The target HDD T_DMARQ output is also passed to the host H_DMARQ input. The definition of control signals (host or target) varies depending on the DMA or UDMA mode selected by a preceding set features command. The data flow controller 36 also connects the host H_DIOR#, H_HDMARDY#, H_HSTROBE output to the target T_DIOR#, T_HDMARDY#, T_HSTROBE input and the host H_DIOW#/STOP output to the T_DIOW#/STOP input. The T_IORDY/T_DDMARDY#/T_DSTROBE is connected from the target device to the host H_IORDY/H_DDMARDY#/H_DSTROBE. The DMA or UDMA mode selected for the data transfer, however, may affect the control signals that are connected.

For DMA transfers, the target HDD 70 asserts the T_DMARQ signal, indicating that it is ready to commence the transfer in response to the MCU 40 transmitting an ATA DMA read or write command (which is equivalent to the ATAPI packet command received from the host). This in turn causes the host side H_DMARQ signal to be asserted (and presented to the host). In one implementation, the data flow controller 36 advances the machine register 39 to the Sending_DATA state (1101) upon detection of the T_DMARQ bit being set by the target HDD 70.

As discussed above, carrier controller 201 is also operative to receive and process ATA commands received from SATA host adapter 31. Support for ATA commands, enables the BIOS on the host to interact with the carrier controller 201 during system boot operations. Typically, ATAPI commands would be used after boot up and drivers are loaded. FIG. 6E illustrates the machine state register transitions and process flow associated with executing ATA commands received from the host. As FIG. 6E illustrates, the data flow controller 36 advances the machine state register 39 to the ATA Receive Command state (0001) upon detection of an ATA command being written into the command register of task file 38. As FIG. 6E shows, the data flow controller 36 also sets the BSY bit in the task file 38. The MCU 40 then parses and executes the received ATA command. Similarly to the foregoing, some ATA commands may require the transfer of data, while others do not. As FIG. 6E shows, the MCU 40 advances the machine state register 39 to the STATUS state (0101), after command execution, in the case of commands which result in no data transfer to or from the host system. Examples of commands that go directly to this state (without passing data to host) include: Set features (0xEF), sleep (0xE6), Standby immediate (0xE0), Check power mode (0xE5), Execute drive diagnostics (0x90), Idle Immediate (0xE1), and No-Op (0x00). In one implementation, the Set features commands are echoed by the MCU 40 to the target HDD 70. In this manner, the appropriate DMA modes as selected by the host are applied to the host task file 38, as well as the task file 72 implemented by the target HDD 70.

If the ATA command requires data transfer, however, the MCU 40 advances to the indirect data transfer states discussed above in connection with FIG. 6A. However, in one implementation, ATA commands present status differently than ATAPI commands. For example, data passing ATA commands do not interrupt the host to present status. There is simply a transition to where BSY=0, RDY=1 in the task file. The host may then read the ERR bit, where '1' indicates an error, and '0' indicates no error. If an error condition exists, the ERR register has more information and may be checked by the host.

In the interest of clarity, not all of the additional features of the implementations described herein are shown and described. For example, the carrier controller 201 can perform other operations, such as managing target HDD diagnostics from SATA passed through to the host operating system, operating the LED indicator and the cartridge ejection mechanisms, handling write protection features of the target HDD, and the like. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

The present invention can also be incorporated into a variety of data storage devices or systems, such as a storage library or autoloader mechanism. In one implementation, one or more iterations of the carrier controller 201 (or a subset of the functionality of the carrier controller 201) can be incorporated into an automated cartridge library mechanism. In one implementation, the interface to which the target HDD 70 removably connects can be incorporated directly into an automated cartridge library mechanism. Similar to a tape storage library system, in one implementation, the system may include a cabinet housing, at least one carrier controller 201, and a robotic mechanism (including, for example, a picker or a robotic arm-hand assembly) that is operative to select cartridges (including the target HDD 70) from a plurality of inventory locations for transport and connection to the interface of carrier controller 201.

Lastly, although the present invention has been described as operating in connection with host systems and hard disk drives employing the ATA/ATAPI protocols, the present invention has application in computing environments employing any suitable device protocols. Moreover, embodiments are described herein in the context of a cartridge carrier. The data flow and bridging architecture described herein can be implemented in connection with a variety of removable data storage systems. In addition, while the bridge circuits, data flow controller and MCU have been described above as separate logic circuits, the functionality corresponding to these circuits may be integrated or combined in a variety of manners without departing from the scope of the present invention. Accordingly, the present invention has been described with reference to specific embodiments. Other embodiments of the present invention will be apparent to one of ordinary skill in the art. It is, therefore, intended that the claims set forth below not be limited to the embodiments described above.

What is claimed is:

1. An apparatus comprising
    a first serial-to-parallel interface bridge that presents a serial data storage device mode interface to a data storage host adapter;
    a second serial-to-parallel interface bridge that presents a serial host mode interface to a data storage unit;
    a data flow control circuit operably connected to the first serial-to-parallel interface bridge and the second serial-to-parallel interface bridge, wherein the data flow control circuit comprises a task file register;
    a controller unit, operably connected to the data flow control circuit, the task file register, and the second serial-to-parallel interface bridge, the controller unit comprising a processor and a command data buffer;
    wherein the data flow control circuit is operative to write a first data transfer command received on the task file register from the data storage host adapter to the command data buffer;
    wherein the controller unit is further operable to access executable instructions physically stored in a memory and, when executed, operable to cause the processor to
        access the first data transfer command stored in the command data buffer;
        generate a second data transfer command in the command data buffer corresponding to the first data transfer command; and
        transmit the second data transfer command to the data storage unit through the second serial-to-parallel interface bridge; and
    wherein the data flow control circuit, responsive to control signals provided by the controller unit, is further operative to directly interface data transfer signals of the data storage host adapter and the data storage unit via the first serial-to-parallel interface bridge and the second serial-to-parallel interface bridge.

2. The apparatus of claim 1 wherein the first data transfer command is embodied in a packet.

3. The apparatus of claim 1 wherein the first serial-to-parallel interface bridge is operative to map serial signals received from the data storage host adapter as parallel signals on the task file register.

4. The apparatus of claim 1 wherein the data flow control circuit, to directly interface data transfer signals, is operative to patch status signals between the data storage host adapter and the data storage unit.

5. The apparatus of claim 1 wherein the data flow control circuit is further operative to write a third command received on the task file register from the data storage host adapter to the command data buffer;
    wherein the controller unit is further operable to access executable instructions physically stored in a memory and, when executed, operable to cause the processor to
        access the third data transfer command stored in the command data buffer;
        generate a fourth command in the command data buffer corresponding to the third command; and
        transmit the fourth command to the data storage unit through the second serial-to-parallel interface bridge;
        receive data from the data storage unit in response to the fourth command;
        generate a response including the data received from the data storage unit; and
        access the task file register to transmit the response to the data storage host adapter via the first serial-to-parallel interface bridge.

6. The apparatus of claim 1 further comprising a machine state register indicating status of command execution, wherein the data flow control circuit and the controller unit are responsive to the status indicated by the machine state register.

7. The apparatus of claim 6 wherein the data flow control circuit and the controller unit are both operative to write to, and read, the machine state register.

8. The apparatus of claim 1 wherein the command data buffer comprises one or more first-in-first-out (FIFO) queues.

9. The apparatus of claim 1 wherein the data flow control circuit, responsive to the control signals, directly passes at least one register signal of the first serial-to-parallel interface bridge to at least one register signal of the second serial-to-parallel interface bridge.

10. An apparatus comprising
    a first serial-to-parallel interface bridge that presents a serial data storage device mode interface to a data storage host adapter;
    a second serial-to-parallel interface bridge that presents a serial host mode interface to a data storage unit;
    a data flow control circuit operably connected to the first serial-to-parallel interface bridge and the second serial-to-parallel interface bridge, wherein the data flow control circuit comprises a task file register;
    a controller unit, operably connected to the data flow control circuit, the task file register, and the second serial-to-parallel interface bridge, the controller unit comprising a processor and a command data buffer;
    wherein the data flow control circuit is operative to write a first data transfer command received on the task file register from the data storage host adapter to the command data buffer;
    wherein the controller unit is further operable to access executable instructions physically stored in a memory and, when executed, operable to cause the processor to
        access the first data transfer command stored in the command data buffer;
        generate a second data transfer command in the command data buffer corresponding to the first data transfer command; and transmit the second data transfer command to the data storage unit through the second serial-to-parallel interface bridge; and wherein the data flow control circuit is further operative to directly interface, responsive to control signals provided by the controller unit, the data storage host adapter and the data storage unit for transmission of data via the task file register, the first serial-to-parallel interface bridge and the second serial-to-parallel interface bridge.

11. The apparatus of claim 10 wherein the data flow control circuit is further operative to write a third command received on the task file register from the data storage host adapter to the command data buffer;

wherein the controller unit is further operable to access executable instructions physically stored in a memory and, when executed, operable to cause the processor to
access the third data transfer command stored in the command data buffer;
generate a fourth command in the command data buffer corresponding to the third command; and
transmit the fourth command to the data storage unit through the second serial-to-parallel interface bridge;
receive data from the data storage unit in response to the fourth command;
generate a response including the data received from the data storage unit; and
access the task file register to transmit the response to the data storage host adapter via the first serial-to-parallel interface bridge.

12. The apparatus of claim 10 wherein the first data transfer command is embodied in a packet.

13. The apparatus of claim 10 wherein the first serial-to-parallel interface bridge is operative to map serial signals received from the data storage host adapter as parallel signals on the task file register.

14. The apparatus of claim 10 wherein the data flow control circuit, to directly interface data transfer signals, is operative to patch status signals between the data storage host adapter and the data storage unit.

15. The apparatus of claim 10 further comprising a machine state register indicating status of command execution, wherein the data flow control circuit and the controller unit are responsive to the status indicated by the machine state register.

16. The apparatus of claim 15 wherein the data flow control circuit and the controller unit are both operative to write to, and read, the machine state register.

17. The apparatus of claim 10 wherein the command data buffer comprises one or more first-in-first-out (FIFO) queues.

18. The apparatus of claim 10 wherein the data flow control circuit, responsive to the control signals, directly passes at least one register signal of the first serial-to-parallel interface bridge to at least one register signal of the second serial-to-parallel interface bridge.

19. An apparatus comprising
a first serial-to-parallel interface bridge that presents a serial data storage device mode interface to a data storage host adapter;
a second serial-to-parallel interface bridge that presents a serial host mode interface to a data storage unit;
a data flow control circuit operably connected to the first serial-to-parallel interface bridge and the second serial-to-parallel interface bridge, wherein the data flow control circuit comprises a task file register;
a controller unit, operably connected to the data flow control circuit, the task file register, and the second serial-to-parallel interface bridge, the controller unit comprising a processor and a command data buffer;
wherein the data flow control circuit is operative to
write a first command received on the task file register from the data storage host adapter to the command data buffer, and
directly interface, responsive to control signals provided by the controller unit, the data storage host adapter and the data storage unit for transmission of data via the task file register, the first serial-to-parallel interface bridge and the second serial-to-parallel interface bridge;
wherein the controller unit is further operable to access executable instructions physically stored in a memory and, when executed, operable to cause the processor to
access the first command stored in the command data buffer to determine whether the first command is a direct or indirect data transfer command;
generate a second data transfer command in the command data buffer corresponding to the first data transfer command;
transmit the second data transfer command to the data storage unit through the second serial-to-parallel interface bridge; and
transmit, if the first command is a direct data transfer command, control signals operative to cause the data flow control circuit to directly interface the data storage host adapter and the data storage unit for transmission of data.

20. The apparatus of claim 19 wherein the data flow control circuit, responsive to the control signals, directly passes at least one register signal of the first serial-to-parallel interface bridge to at least one register signal of the second serial-to-parallel interface bridge.

* * * * *